Patented Feb. 26, 1924.

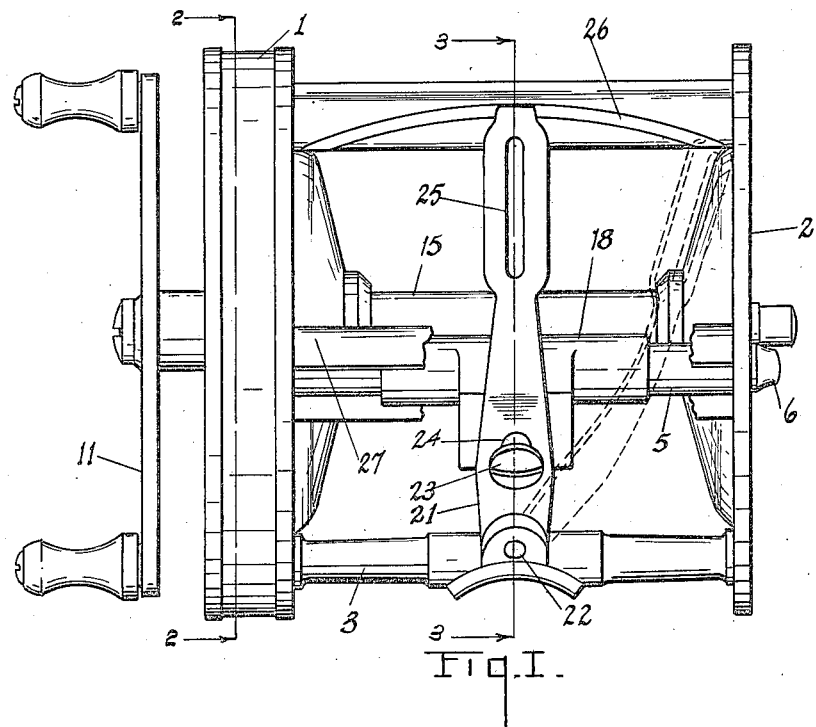
Fig. I.
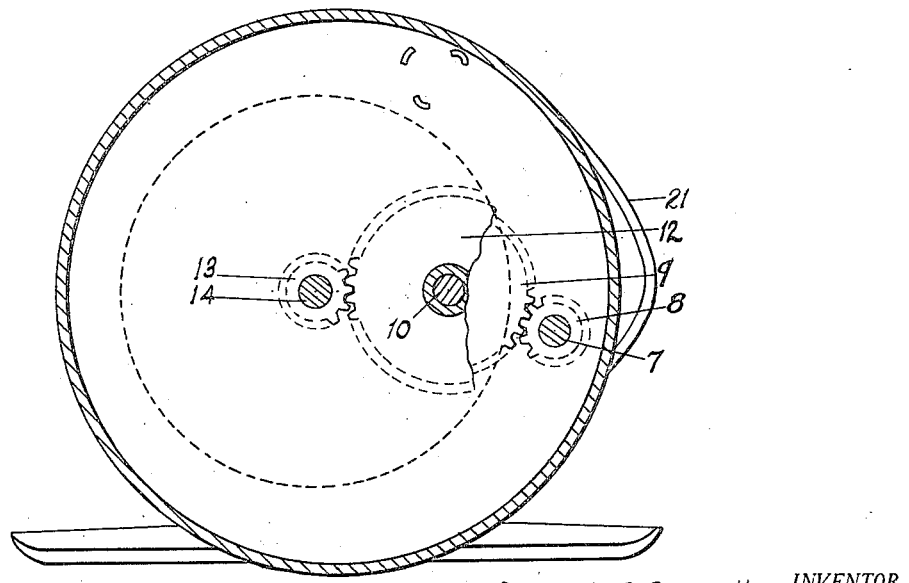
Fig. II.
Samuel G. Russell  INVENTOR.
BY Chappell Earl ATTORNEYS

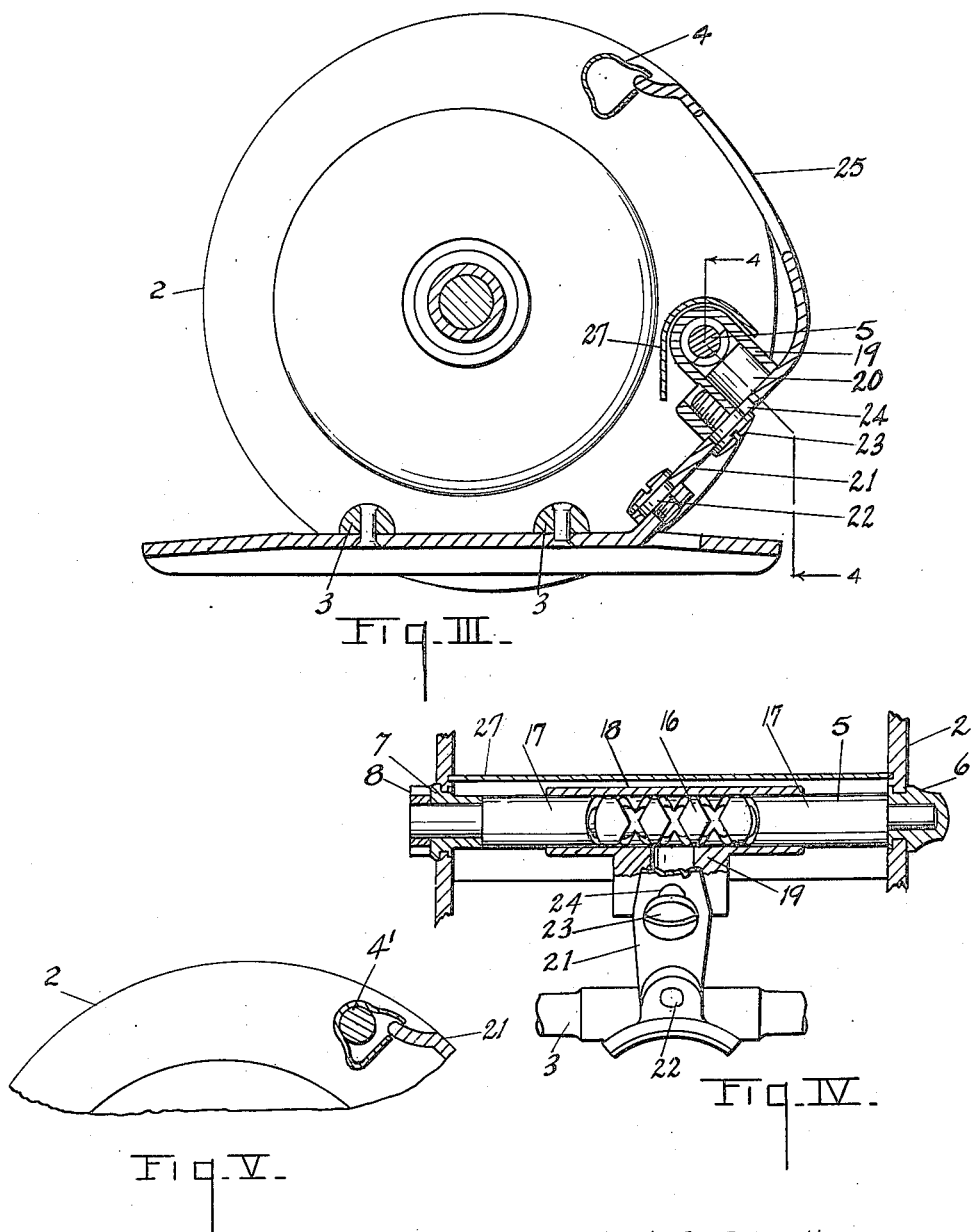

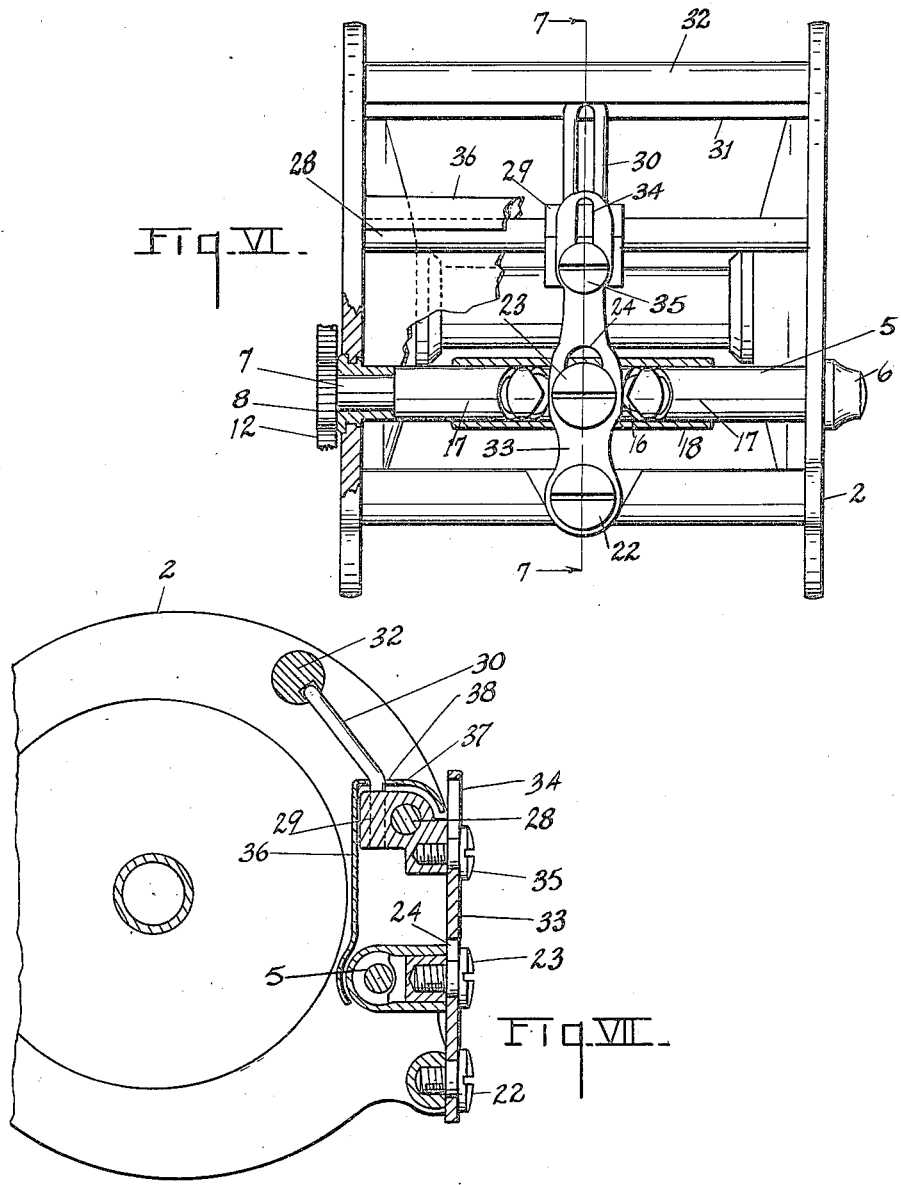

1,484,906

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

FISHING REEL.

Application filed March 6, 1922. Serial No. 623,109.

*To all whom it may concern:*

Be it known that I, SAMUEL G. RUSSELL, a citizen of the United States, residing at the city and county of Kalamazoo, State of Michigan, have invented certain new and useful Improvements in Fishing Reels, of which the following is a specification.

This invention relates to improvements in fishing reels.

The main objects of this invention are:

First, to provide an improved fishing reel of the line traversing type in which the threaded portions of the traversing shaft are protected so that the carriage is not likely to bind or be subjected to undue wear.

Second, to provide in a fishing reel an improved line traversing means.

Third, to provide in a fishing reel an improved line traversing means in which the parts are of substantial size and not likely to become worn or inoperative in use.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing forming a part of this application, in which:

Fig. I is a front elevation of a fishing reel embodying the features of my invention, portions being broken away for convenience in illustration.

Fig. II is a transverse section through the head member of the frame on a line corresponding to line 2—2 of Fig. I.

Fig. III is a transverse section on a line corresponding to line 3—3 of Fig. I, the parts being shown in full lines for convenience in illustration.

Fig. IV is a detail view, partially in longitudinal section, on a line corresponding to the broken line 4—4 of Fig. III.

Fig. V is a detail transverse section of a modified form, the modification being in one of the cross members of the frame.

Fig. VI is a front elevation, partially in section, of another modified form of my invention.

Fig. VII is a transverse section on a line corresponding to line 7—7 of Fig. VI.

In the drawings the sectional views are taken looking in the direction of the little arrows at the ends of the section lines and similar numerals of reference refer to similar parts throughout the several views.

Referring to the drawing, 1 represents the chambered head of the reel and 2 the tail plate thereof. The head and tail plate are connected by pillars as 3 and the cross member 4. Other pillars or cross members may be provided as desired, the same not being here illustrated.

The traversing shaft 5 is supported in bearings 6 and 7 in the frame and is provided with a pinion 8 arranged in the head member to mesh with the pinion 9 on the shaft 10 of the crank 11. The gear 12 on this shaft 10 meshes with the pinion 13 on the shaft 14 of the spool 15.

The traversing shaft has a central threaded portion 16, and unthreaded portions 17 at each end of substantial length. The carriage 18 reciprocates on this traversing shaft, the carriage having a tubular part of such length as to cover the threaded portion of the shaft when the carriage is at either limit of its stroke, thus protecting the threaded portions of the shaft and preventing it becoming clogged with dirt or grit, the unthreaded portions of the shaft being wiped and kept clean by the carriage. This long carriage has the further advantage of preventing binding of the carriage on the shaft.

The carriage is provided with a socket 19 for the pawl 20, this socket being open at the outer side of the carriage. The traversing lever 21 is pivoted at 22 on the frame and operatively connected to the carriage by the pin 23 which engages the longitudinal slot 24 of the lever. The lever being bent or angled, its upper end projects inwardly toward the rear and has an elongated line guide eye 25 therein.

The end of the lever 21 travels in a curved slot or groove 26 in the cross member 4 of the frame which is preferably formed up of sheet metal as illustrated. The lever, with the parts arranged as shown in Fig. III, constitutes a retaining means for the pawl.

In the modification shown in Fig. V the cross member 4 of the frame is supported by a pillar 4'. A housing 27 is provided for the traversing shaft, this housing being disposed at the rear of and overhanging the traversing shaft and carriage and preventing the line from becoming entangled with the carriage, and also keeping dirt and water from dropping on the shaft.

In the modification shown in Figs. VI and VII the traversing shaft and carriage are substantially the same as described, there being, however, a slide rod 28 disposed above and parallel to the traversing shaft, this slide rod supporting a slide 29 carrying a line guide 30.

This line guide 30 is engaged in a straight slot 31 in the cross member 32 of the frame. The lever 33 is, in this embodiment, a straight lever and has a slot 34 at its upper end, the lever being connected to the slide 29 by the pin 35 engaging the slot 34. The housing 36 in this embodiment is disposed at the inside of the traversing shaft and the slide rod and it is provided with an overhanging portion at its upper end slotted at 38 to receive the eye 30. The housing thus arranged prevents the line from becoming entangled with the carriage and slide or the actuating lever.

With this arrangement of parts I secure the necessary throw to the line traversing means with a comparatively short threaded section on the traversing shaft, and I am able to employ a long carriage and effectively protect the bearing parts.

It will be observed that the spool has conical flanges as is usual in fishing reels of this type. By providing an angular traversing lever, I not only secure compactness but, as the lever oscillates, its outer or swinging end swings to a position at the end of its stroke substantially parallel with the planes of the spool flanges, or, in other words, an angular position to the axis of the spool corresponding to the angle of the flanges relative thereto. By providing this angular lever with an elongated eye, the line is evenly laid against the flanges as the body is built up on the spool.

I have illustrated and described two embodiments or adaptations of my improvements which I believe will enable those skilled in the art to which my invention relates to embody or adapt the same as may be desired.

Having thus described my invention what I claim as new and desire to secure by Letters Patent is:

1. In a fishing reel, the combination of a frame, a spool, a traversing shaft having unthreaded portions of substantial length at each end thereof, a carriage slidable on said traversing shaft and having a tubular part of such length as to embrace the threads of said shaft when the carriage is at the ends of its stroke, said carriage having an outwardly facing pawl socket, a pawl disposed in said socket to coact with said shaft, an angled line traversing lever pivotally mounted on said frame below said shaft and longitudinally slotted, a pin on said carriage engaging said slot, said lever constituting a retaining means for said pawl and having a line guide in its upper end, and a cross member on said frame having a curved groove therein receiving the end of said lever.

2. In a fishing reel, the combination of a frame, a spool, a traversing shaft having unthreaded portions of substantial length at each end thereof, a carriage slidable on said traversing shaft and having a tubular part of such length as to embrace the threads of said shaft when the carriage is at the ends of its stroke, said carriage having an outwardly facing pawl socket, a pawl disposed in said socket to coact with said shaft, a line traversing lever pivotally mounted on said frame below said shaft and longitudinally slotted, and a pin on said carriage engaging said slot, said lever constituting a retaining means for said pawl.

3. In a fishing reel, the combination of a frame, a spool, a traversing shaft having unthreaded portions of substantial length at each end thereof, a carriage slidable on said traversing shaft and having a part of such length as to embrace the threads of said shaft when the carriage is at the ends of its stroke, said carriage having a pawl coacting with said shaft, an angled line traversing lever pivotally mounted on said frame below said shaft and longitudinally slotted, a pin on said carriage engaging said slot, and a cross member on said frame having a curved groove therein receiving the end of said lever.

4. In a fishing reel, the combination of a frame, a spool, a traversing shaft having unthreaded portions of substantial length at each end thereof, a carriage slidable on said traversing shaft and having a part of such length as to embrace the threads of said shaft when the carriage is at the ends of its stroke, said carriage having a pawl coacting with said shaft, a line traversing lever pivotally mounted on said frame below said shaft and longitudinally slotted, and a pin on said carriage engaging said slot.

5. In a fishing reel, the combination of a frame, a spool, a traversing shaft, a reciprocating carriage having an outwardly facing pawl socket, a pawl disposed in said socket to coact with said shaft, an angled line traversing lever pivotally mounted on said frame below said shaft and longitudinally slotted, a pin on said carriage engaging said slot, said lever constituting a retaining means for said pawl and having a line guide in its upper end, and a cross member on said frame having a curved groove therein receiving the end of said lever.

6. In a fishing reel, the combination of a frame, a spool, a traversing shaft, a reciprocating carriage having an outwardly facing pawl socket, a pawl disposed in said socket to coact with said shaft, a line traversing lever pivotally mounted on said frame below said shaft and longitudinally slotted, and a pin on said carriage engaging said slot, said lever constituting a retaining means for said pawl and having a line guide in its upper end.

7. In a fishing reel, the combination of a frame, a spool, a traversing shaft having unthreaded portions of substantial length at each end thereof, a carriage slidable on said traversing shaft and of such length as to embrace the threads of said shaft when the carriage is at the ends of its stroke, said carriage having a pawl coacting with said shaft, a line traversing lever pivotally mounted on said frame and operatively associated with said carriage, and a housing overhanging said traversing shaft.

8. In a fishing reel, the combination of a frame, a spool, a traversing shaft having unthreaded portions of substantial length at each end thereof, a carriage slidable on said traversing shaft and of such length as to embrace the threads of said shaft when the carriage is at the ends of its stroke, said carriage having a pawl coacting with said shaft, and a line traversing lever pivotally mounted on said frame and operatively associated with said carriage.

9. In a fishing reel, the combination of a frame, a spool, a traversing shaft, a reciprocating carriage, an angled line traversing lever pivotally mounted on said frame and operatively associated with said carriage, and a cross member on said frame having a segmental groove therein receiving the upper end of said lever.

10. In a fishing reel, the combination of a frame, a spool, a traversing shaft having unthreaded portions of substantial length at each end thereof, a carriage reciprocating on said traversing shaft and having a part of such length as to embrace the threads of said shaft when the carriage is at either end of its stroke, and an angled line traversing lever pivotally mounted on said frame and operatively connected to said carriage.

11. In a fishing reel, the combination of a frame, a spool, a traversing shaft having unthreaded portions of substantial length at each end thereof, a carriage reciprocating on said traversing shaft and having a part of such length as to embrace the threads of said shaft when the carriage is at either end of its stroke, and a line traversing lever pivotally mounted on said frame and operatively connected to said carriage.

12. In a fishing reel, the combination of a frame, a spool, a traversing shaft having unthreaded portions of substantial length at each end thereof, a line traversing carriage reciprocating on said traversing shaft and having a part of such length as to embrace the threads of said shaft when the carriage is at either end of its stroke, and a housing overhanging said traversing shaft.

13. In a fishing reel, the combination of a frame, a spool, a traversing shaft having unthreaded portions of substantial length at each end thereof, and a line traversing carriage reciprocating on said traversing shaft and having a part of such length as to embrace the threads of said shaft when the carriage is at either end of its stroke.

14. In a fishing reel, the combination of a frame, a spool provided with conical flanges, a traversing shaft, a reciprocating carriage, an angled line traversing lever pivotally mounted on said frame at a central point thereof and operatively connected to said carriage, the angle of said lever exceeding that of a right angle and being such that at the end of its stroke the swinging end of the lever lies at an angle to the axis of the spool approximating that of the angle of the flanges relative thereto, said lever being provided with an elongated line guide eye.

15. In a fishing reel, the combination of a frame, a spool provided with conical flanges, a traversing shaft, a reciprocating carriage, an angled line traversing lever pivotally mounted on said frame at a central point thereof and operatively connected to said carriage, the angle of said lever exceeding that of a right angle and being such that at the end of its stroke the swinging end of the lever lies at an angle to the axis of the spool approximating that of the angle of the flanges relative thereto.

16. In a fishing reel, the combination of a frame, a spool provided with flanges disposed at an angle to the axis of the spool exceeding that of a right angle, an angled line traversing lever pivotally mounted on said frame, and means for operating said lever operatively associated with said spool, the angle of said lever being such that at the end of its stroke its swinging end lies at an angle to the axis of the spool approximating the angle of the flanges relative thereto, said lever being provided with an elongated line guide eye.

17. In a fishing reel, the combination of a frame, a spool provided with flanges disposed at an angle to the axis of the spool exceeding that of a right angle, an angled line traversing lever pivotally mounted on said frame, and means for operating said lever operatively associated with said spool, the angle of said lever being such that at the end of its stroke its swinging end lies at an angle to the axis of the spool approximating the angle of the flanges relative thereto.

In witness whereof I have hereunto set my hand and seal.

SAMUEL G. RUSSELL. [L. S.]